United States Patent [19]

Hauser et al.

[11] Patent Number: 5,508,097
[45] Date of Patent: Apr. 16, 1996

[54] PLASMA SPRAY MASKING TAPE

[75] Inventors: Richard A. Hauser, Hidden Valley Shaftsbury, Vt.; Robert F. Hamilton, Eagle Bridge, N.Y.

[73] Assignee: AlliedSignal Inc., Morris Township, N.J.

[21] Appl. No.: 248,995

[22] Filed: May 25, 1994

Related U.S. Application Data

[63] Continuation-in-part of Ser. No. 964,167, Oct. 21, 1992, Pat. No. 5,322,727.

[51] Int. Cl.$^6$ .......................... B32B 25/20; B32B 33/00; C09J 7/04
[52] U.S. Cl. .......................... 428/252; 427/446; 427/448; 427/282; 428/266; 428/354; 428/356
[58] Field of Search .................................. 428/266, 354, 428/252, 356; 427/446, 448

[56]  References Cited

U.S. PATENT DOCUMENTS

| | | |
|---|---|---|
| 4,246,313 | 1/1981 | Stengle, Jr. . |
| 4,636,427 | 1/1987 | Ohno et al. . |
| 4,762,751 | 8/1988 | Girgis et al. . |
| 4,822,659 | 4/1989 | Anderson et al. . |
| 5,112,693 | 5/1992 | Johansen . |

FOREIGN PATENT DOCUMENTS

| | | |
|---|---|---|
| 4239578 | 8/1992 | Japan . |
| 1072891 | 1/1965 | United Kingdom . |

OTHER PUBLICATIONS

PCT Search Report.
"Flame Spray Tapes From Fluorglas"–AlliedSignal Inc.

*Primary Examiner*—James C. Cannon
*Attorney, Agent, or Firm*—Roger H. Criss

[57]  ABSTRACT

A masking tape for use in masking a part in a high velocity oxy-fuel (HVOF) plasma spray process. The tape is formed from a fabric which is tightly woven from yarns of aramid fibers. A silicone rubber impregnates the inner fabric layer. First and second silicone rubber layers are coated onto opposite sides of the impregnated fabric. A first silicone pressure-sensitive adhesive, which is a rare metal cured adhesive, is coated onto the second silicone rubber layer. A second silicone pressure-sensitive adhesive is coated onto the first silicone pressure-sensitive adhesive. A release liner is preferably laminated to the second pressure-sensitive adhesive.

19 Claims, No Drawings

PLASMA SPRAY MASKING TAPE

CROSS-REFERENCE TO RELATED APPLICATIONS

This application is a continuation-in-part of U.S. patent application Ser. No. 964,167, filed Oct. 21, 1992, now U.S. Pat. No. 5,322,727.

BACKGROUND OF THE INVENTION

1. Field of the Invention

This invention related to a flame spray tape to mask articles during a plasma spray process.

2. Description of the Prior Art

Plasma or flame spraying of parts is a known technique for applying a protective metal or ceramic coating to the part. Such process provides a thermal spray coating over the part by bringing the metal or ceramic to the melting point and spraying on a surface to produce a thin coating. Plasma spray coating typically is achieved using a plasma gun or similar device.

In the plasma spray process, it is important to mask certain areas of the parts in order to prevent application of the coating. Reasons for masking parts include preventing the coating from entering apertures in the part, maintaining dimensions within a critical range, weight savings and the like. To achieve such masking, a masking tape is applied over the areas in which the coating is not desired.

The masking tape must exhibit excellent thermal and abrasion-resistance, both in protecting adjacent surfaces from the grit blasting that is typically used as a surface preparation and the actual plasma spray coating. Such tape must not lift off or fray during this demanding process and are designed to quickly and easily release from the part surface without leaving an adhesive residue.

Conventional plasma spray tapes typically include a glass fabric which is impregnated with a silicone adhesive and which is coated with a high temperature silicone pressure sensitive adhesive. A release liner is usually employed for convenient handling. Other types of masking tapes include a thin aluminum foil laminated to a fiber glass cloth.

Although such masking tapes are effective with the typical plasma spray process, they are not effective with a recently introduced, more demanding process known as a high velocity oxy-fuel (HVOF) process. This process is a continuous combustion process in which the spray gun is essentially a rocket in which the powder is injected into the exhaust stream. The exhaust stream is exiting at hypersonic speed (several thousand feet per second).

The above-referenced patent application describes a masking tape for the HVOF process which includes an inner fabric layer formed of aramid fibers, a silicone rubber impregnating the fabric, a first silicone rubber layer coated onto one face of the impregnated fabric, a second silicone rubber layer coated onto the other face of the fabric, and a silicone pressure-sensitive adhesive coated onto the second silicone rubber layer. It has been discovered that the peel strength of such a tape to a supporting structure (e.g., the part to be coated) is not maintained over time. As a result, in some situations such tape may not be capable of adhering to the part to be protected and withstanding many passes of the HVOF gun.

It would be desirable to provide an improved plasma spray masking tape which retains its peel strength and will withstand the extremely demanding HVOF process.

SUMMARY OF THE INVENTION

In accordance with this invention, there is provided a masking tape for use in masking against a high velocity oxy-fuel plasma spray process, the masking tape comprising:

(a) an inner fabric layer formed of tightly woven yarns of aramid fibers;

(b) a silicone rubber impregnating the inner fabric layer, the resultant impregnated layer having a first face and a second face;

(c) a first silicone rubber layer coated on the first face of the impregnated inner fabric layer;

(d) a second silicone rubber layer coated on the second face of the impregnated inner fabric layer;

(e) a first silicone pressure-sensitive adhesive coated onto the second silicone rubber layer; said first silicone pressure-sensitive adhesive being a rare metal cured silicone adhesive; and (f) a second silicone pressure-sensitive adhesive coated onto the first silicone pressure-sensitive adhesive.

It has been found that the use of the specified silicone pressure-sensitive adhesive between the second silicone rubber layer and the outer silicone pressure-sensitive adhesive layer provides excellent peel strength which is retained over a period of time. The improved tape does not delaminate from the surface to be protected during the HVOF process.

Preferably, the first silicone pressure-sensitive adhesive is a platinum cured methyl silicone adhesive. The second silicone pressure-sensitive adhesive is different from the first one, and preferably is a peroxide cured phenyl silicone adhesive.

DESCRIPTION OF THE PREFERRED EMBODIMENTS

The masking tape of this invention is useful in a high velocity oxy-fuel (HVOF) plasma spray process. The tape has an internal fabric layer which is tightly woven from aramid fibers. A preferred fabric layer is a woven aramid fabric available under the trademark Kevlar. Preferably, the yarns have a substantially flat cross-section, and the fabric is woven in a plain weave, although other weaves may be employed.

As mentioned above, the fabric employed in this invention is woven from aramid fiber yarns in a tightly woven pattern. This reduces the open spaces between the overlapping yarns. Preferably, the fabric has a thread count of from about 20×20 to about 30×30 (per inch). The fabric preferably is a relatively light weight fabric which has a weight of from about 1.5 to about 5 ounces/square yard. The thickness of the fabric may range, for example, from about 3 to about 10 mils.

The fabric layer is impregnated with a silicone rubber, which may be accomplished in any suitable manner. Preferably, the silicone rubber is applied by a dip coating and metering process and the fabric is dried in a drying oven. The silicone rubber employed is a liquid having a low viscosity and is typically formed by mixing and blending a two component system. The viscosity of the mixed material typically may be in the range of about 15,000 to about 35,000 cps. The silicone rubber preferably is a material which is a platinum catalyzed addition reaction product. The fabric is impregnated with the silicone rubber such that the entire fabric is within a silicone rubber matrix. The silicone rubber may extend beyond the fabric's outer surfaces to any desired amount.

After the aramid fabric is impregnated with the silicone rubber, a layer of silicone rubber is coated onto one side of the impregnated aramid fabric. Preferably, the side that is coated first is the front side of the fabric, i.e., the side that faces the plasma spray in use. The silicone rubber employed as the coating layer preferably is the same type of silicone rubber that is used to impregnate the aramid fabric. The silicone rubbers employed in this invention are also referred to as silicone elastomers. The silicone rubber may contain one or more conventional fillers. In order to increase the abrasion resistance of the tape, the filler preferably is an abrasion resistant material, such as glass beads, metal flakes, amorphous silica and the like. Glass beads is the preferred filler material.

The coating of the silicone rubber layer onto the impregnated aramid fabric layer can be performed using any suitable technique. Preferably, the silicone rubber coating is applied by a horizontal knife over roll coater and the coated fabric is dried in a drying oven.

The thickness of the first coating layer (on the back side of the fabric) may range from about 5 to about 20 mils, preferably from about 12 to about 16 mils.

The impregnated aramid fabric is then coated on its opposite face, also with a silicone rubber. Again, any suitable coating technique can be employed. Preferably, the same type of coating apparatus that is used to coat the front side of the fabric is also used to coat the opposite side. This second silicone rubber layer may likewise contain one or more fillers.

The thickness of the second coating layer is generally thinner than that of the first coating, and may range from about 3 to about 20 mils, preferably about 6 to about 10 mils.

It may be possible to apply both the first and second coatings at the same time to opposite sides of the fabric. In each coating step, an appropriate drying operation is employed.

A first silicone pressure-sensitive adhesive layer is coated onto the exterior of the second silicone rubber layer. As mentioned above, this silicone pressure-sensitive adhesive is a rare metal cured adhesive, and is preferably a platinum cured adhesive. Also preferably, the adhesive is a methyl silicone adhesive. Such adhesive is normally prepared from separate formulations of adhesive and accelerator (which contains the curing agent). The adhesive layer is preferably applied by a reverse roll coater and is dried in a drying oven. Typically, the thickness of the first silicone adhesive layer is about 1 to about 5 mils, preferably about 2 to about 4 mils.

Coated onto the first silicone pressure-sensitive adhesive is a second silicone pressure-sensitive adhesive. Any suitable silicone adhesive may be employed, preferably a peroxide cured silicone pressure-sensitive adhesive. Preferred is a high temperature methyl phenyl silicone adhesive. A blend of two silicone pressure-sensitive adhesives is particularly preferred, one of which provides a combination of temperature resistance and the other which provides high peel strength. The second adhesive layer is also preferably applied by a reverse roll coater and is dried in a drying oven. Typically, the thickness of the second silicone adhesive layer is about 1 to about 5 mils, preferably about 2 to about 4 mils. The thickness of both pressure-sensitive layers may or may not be the same.

A release liner is preferably laminated to the second silicone adhesive layer in a conventional manner. The release liner may be any liner that is typically used for silicone pressure-sensitive adhesives.

In some cases, a more flexible masking tape may be desired. In such cases, the thickness of both silicone rubber layers should be reduced. For example, in such construction each silicone rubber layer may have a thickness of about 3 to 8 mils, preferably 4 to 6 mils.

As mentioned above, the masking tape of this invention finds suitability to mask HVOF plasma sprayed parts. In such process, the tape must be able to withstand high impact at temperatures in the range of above about 500° F. (260° C.). It is believed that the aramid fabric layer provides increased strength, flexibility and abrasion resistance to the masking tape structure. The impregnated silicone adhesive is believed to also improve the abrasion resistance of the construction. In addition, the use of the silicone layer beneath the fabric is believed to provide impact resistance so as to cushion the impact of the spray particles, thereby allowing the fabric to absorb more energy from the spray.

It has been surprisingly found that by using two pressure-sensitive silicone adhesives, one of which is a rare metal cured adhesive which is coated onto the second silicone rubber layer and is located beneath an exterior facing silicone pressure-sensitive adhesive, the peel strength of the tape is high and such peel strength is retained over time. Thus, the tape of this invention can be stored in a roll form and applied to the surface to be protected, with excellent bonding to such surface. The tape does not delaminate from the surface to be protected during the HVOF process. These attributes are present even in constructions where the total thickness of both the first and second silicone pressure-sensitive adhesive layers are about the same as previous constructions which used only a silicone pressure-sensitive adhesive of the type that is in the second layer of this invention.

While not wishing to be bound to any theory, it is believed that the first silicone pressure-sensitive adhesive acts as a blocker layer to prevent migration of the peroxide catalyst from the second, exterior adhesive layer into the underlying second silicone rubber layer. Such migration may have in previous constructions caused the pressure-sensitive adhesive to inadequately cure, and acid by-products from the peroxide catalyst could migrate back into the adhesive layer causing it to degrade. The presence of the first silicone pressure-sensitive adhesive layer in accordance with this invention prevents such migration of the peroxide catalyst and yet still provides excellent bonding to the underlying second silicone rubber layer.

The HVOF plasma spray tape of the present invention can be applied to mask an object for spraying in a simplified process. This is in contrast to the expensive and time-consuming previously employed system in which a metal tool is designed and made to mask the object to be coated. In addition, the masking tape of this invention can be used to make the coating of irregularly shaped objects possible. The masking tape of this invention provides excellent adhesion to the object to be sprayed and the peel strength is retained over time. The tape can be used in the HVOF process without delaminating from the protected part.

What is claimed is:

1. A masking tape for use in masking against a high velocity oxy-fuel plasma spray process, said masking tape comprising:

(a) an inner fabric layer formed of tightly woven yarns of aramid fibers;

(b) a silicone rubber impregnating said inner fabric layer, the resultant impregnated layer having a first face and a second face;

(c) a first silicone rubber layer coated on the first face of said impregnated inner fabric layer;

(d) a second silicone rubber layer coated on the second face of said impregnated inner fabric layer;

(e) a first silicone pressure-sensitive adhesive coated onto said second silicone rubber layer; said first silicone pressure-sensitive adhesive being a rare metal cured silicone adhesive; and (f) a second silicone pressure-sensitive adhesive coated onto said first silicone pressure-sensitive adhesive.

2. The masking tape of claim 1, wherein said first silicone pressure-sensitive adhesive is a platinum cured pressure-sensitive adhesive.

3. The masking tape of claim 2, wherein said first silicone pressure-adhesive is a methyl silicone adhesive.

4. The masking tape of claim 1, wherein said second silicone pressure-sensitive adhesive is a peroxide cured pressure-sensitive adhesive.

5. The masking tape of claim 4, wherein said second silicone pressure-sensitive adhesive is a phenyl silicone pressure-sensitive adhesive.

6. The masking tape of claim 1, wherein said fabric layer is impregnated such that the entire fabric layer is within a silicone rubber matrix.

7. The masking tape of claim 1, wherein said first silicone rubber layer comprises an abrasive-resistant filler.

8. The masking tape of claim 7, wherein said filler is glass beads.

9. The masking tape of claim 1, wherein said first silicone pressure-sensitive adhesive has a thickness of from about 1 to about 5 mils.

10. The masking tape of claim 1, wherein said second silicone pressure-sensitive adhesive has a thickness of from about 1 to about 5 mils.

11. The masking tape of claim 1, further comprising a release liner laminated to said second silicone pressure-sensitive adhesive.

12. The masking tape of claim 1, wherein said fabric layer is woven from substantially flat aramid yarns.

13. The masking tape of claim 12, wherein said fabric layer has a thickness of from about 3 to about 10 mils.

14. The masking tape of claim 12, wherein said fabric layer has a weight of from about 1.5 to about 5 ounces/square yard.

15. The masking tape of claim 12, wherein said fabric layer has a thread count of from about 20×20 to about 30×30 per inch.

16. The masking tape of claim 12, wherein said woven fabric has a plain weave.

17. The masking tape of claim 1, wherein said first silicone rubber layer has a thickness of from about 5 to about 20 mils.

18. The masking tape of claim 12, wherein said second silicone rubber layer has a thickness of from 3 to about 20 mils.

19. The masking tape of claim 1, wherein said first silicone rubber layer is thicker than said second silicone rubber layer.

* * * * *